United States Patent Office 3,716,998
Patented Feb. 20, 1973

3,716,998
MEANS FOR NEUTRALIZING SUBMARINE EROSION
Flemming Lerche-Svendsen, Skovholmvej 11, Charlottenlund, Denmark, and Erik Nielsen, Strandvejen 15, Frederikshavn, Denmark
Filed July 19, 1971, Ser. No. 163,809
Int. Cl. E02b *3/12*
U.S. Cl. 61—38
7 Claims

ABSTRACT OF THE DISCLOSURE

A means for neutralizing submarine erosion by providing materials which are obtainable at a low cost easily positioned on the sea-bed, and resistant to the action of the water. This is achieved when endless strips or narrow lengths of thin, non-woven fabrics, having a maximum density somewhat higher than the specific gravity of the water, are positioned near the sea-bed, in bundles parallel to each other, and in the main parallel to the sea-bed, the strips in each bundle being joined together at intervals, and the individual lengths of the strips in a bundle between one joining point and the following being varied at least in the case of some of the strips.

---

This invention relates to a means for neutralizing submarine erosion and building up and securing the natural migration of materials under water and securing artificially supplied granulated filling materials, especially sand, in connection with hydraulic construction works.

During the work on improving the known methods and means for coast protection it has been found that waste strips of non-woven materials is a cheap material which may advantageously be used to form what can be called artificial seaweed chains.

The object of the invention is to provide a means for coast protection using materials which are obtainable at a low cost, easily positioned on the sea-bed, and resistant to the action of the water.

According to the invention, this is achieved when endless strips or narrow lengths of thin, non-woven fabrics, having a maximum density somewhat higher than the specific gravity of the water, are positioned near the sea-bed, in bundles parallel to each other, and in the main parallel to the sea-bed, the strips in each bundle being joined together at intervals, and the individual lengths of the strips in a bundle between one joining point and the following being varied at least in the case of some of the strips.

The non-woven materials used are such as spunbonded or needled non-woven fabrics. They are manufactured by making a layer of staple fibers. This layer is then sprayed with a bonding solution, dried and rolled, or, if thermoplastic fibers are used, heated so that part of the fiber material is fused, after which the layer is rolled.

If desired, the material may be reinforced by long, thick, endless fibers arranged at intervals. Material of this kind is, for instance, used for cheap carpets, as a substitute for hessian and as buckram.

Such non-woven fabrics are resistant to attack by water, as the fibers usually are covered with a thin layer of hydrophobic material, nevertheless they can be slightly porous.

For use as means according to the present invention the material must have a density not much higher than that of the surrounding water.

A specially preferred material is non-woven fabric manufactured from polypropylene fibers, as this material can be obtained at a very low cost.

In a preferred embodiment of the invention, 10 to 20 strips are used in each bundle (forming what may be called a seaweed chain), and the joining points being made with a distance of 1 to 2 meters between them. The width of the strips is preferably 30 to 100 mm. However, both the number of strips in each seaweed chain and the distance between the points of joining as well as the width of the strips, may be further varied. The length of the seaweed chain is adapted to conditions, but in principle it is endless.

The production of the seaweed chains can be made in connection with the positioning, as no mechanical equipment is needed.

The strips are delivered on spools or in pressed bales. The desired number of strips, for instance 20 strips, are pulled off the corresponding numbers of spools in such a way, however, that for each point of joining the smallest length is pulled off one of the 20 spools and the greatest length off another of the 20 spools, whereas from the other 18 spools, strips are pulled off in lengths varying from the length of No. 20 down to the length of No. 1 strip. The free ends of the strips are joined, for instance by means of a ligature, the pulling off of the strips then being continued. The joining points, or at least some of them, are anchored to the sea-bed during the positioning of the chain thus formed. When positioned, the longer strips will bulge along the chain between the joining points, and each chain with its bulging portions will constitute an effective current braking and sand collecting barrier, similar to that formed by natural seaweed.

Different kinds of anchoring means may be used for the chains, for instance blocks of concrete cast around the points of joining. Anchoring pipes, which are embedded under hydraulic pressure, may also be used.

A preferred form of anchoring for the artificial seaweed chains consists of two concrete blocks, not heavier than that they can be lifted and handled by a man, and which are mutually connected with strips of the same non-woven material as used for the chain strips, the connecting strips being cast in the blocks. By twining the connecting strips between the two blocks around the strips of the chain, the anchoring member then acts both as an anchoring member and as joining means for the chain strips. Thus the positioning can take place extremely fast and at a low cost.

The chain may be positioned in parallel rows, in patterns or in groups, according to local conditions. Should it be desirable to place them in cross patterns on the sea-bed, the anchor means and the chains may be positioned so that the chains cross each other at joining points and that the anchor means are positioned at these points. The possibilities of variation in building up these artificial seaweed chains are so great that they are usable under many different conditions. Thin seaweed chains may, for instance, serve as marine clay collectors in marshland. Stronger seaweed chains may, for instance, serve to avoid that the return water, when pumping in the sand for filling up, withdraws too much of the sand pumped in. Submarine groynes may be built of very strong seaweed chains, securely anchored, having most of the advantages of the traditional groynes, but none of the disadvantages of same, especially the high cost of construction and the damaging undermining typical for heavy constructions.

The invention is illustrated in the following with reference to the drawing.

On the drawing, seaweed chains are shown according to the invention and also various anchoring means that can be used when positioning seaweed chains.

Figure 1:
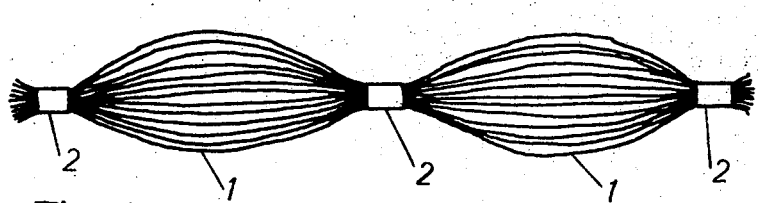
FIG. 1 shows a seaweed chain seen from the side.
Figure 2:
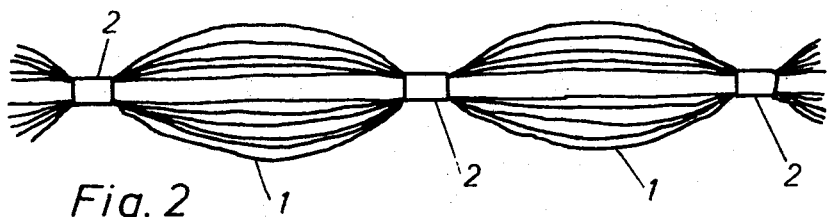
FIG. 2 shows the same from above, 1 shows the strips forming the characteristic bag, and 2 shows the points of joining.
Figure 3:
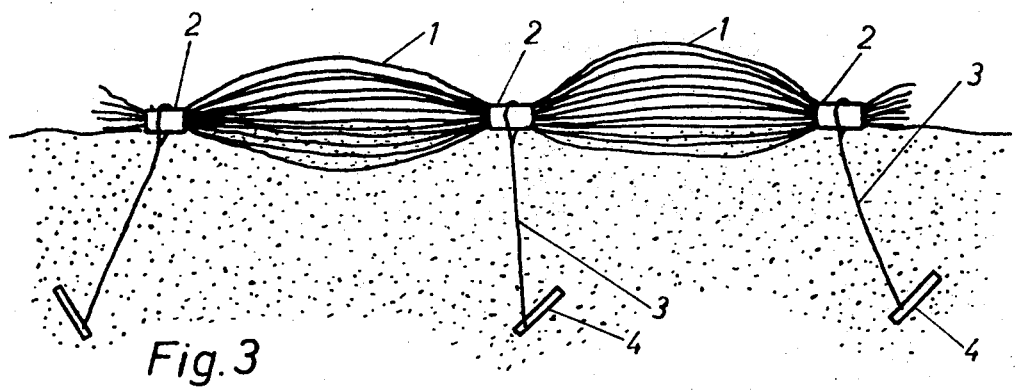

FIG. 3 shows a cross section through the bottom of the water on which a seaweed chain is placed with the characteristic bag of the strips 1. At the points of joining 2 a line 3 is secured, the other end of which is secured to an anchoring pipe 4 embedded under hydraulic pressure. This form for anchoring makes it possible to place seaweed chains in places where there is a very strong current.

Figure 4:
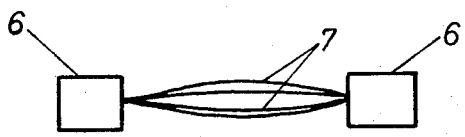

FIG. 4 shows the aforementioned anchoring member consisting of two concrete blocks 6, in which strips of non-woven material 7 are cast, said strips connecting the two blocks.

Figure 5:
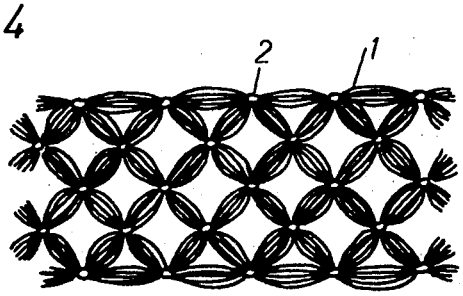

FIG. 5 shows an example of seaweed chains according to the invention in a fixed patern, several seaweed chains 1 being assembled at the points of joining 2. It may be of some importance to have these seaweed mats lying finished in store, so that they may be used at short notice in threatened places. By using these seaweed mats in deep water, an effective result is assured, as it would be very difficult to correct or adjust the seaweed chains after positioning them in deep water.

Experiments have shown that for some reason or other the synthetic materials that it is intended to use when preparing seaweed chains attract mussels to a high degree if placed in areas of salt water. These mussels will give an increased effect of the seaweed chain and this is perhaps an ability that might be used intentionally. In this connection it is a known fact that erosion does not occur, or only seldom so, along coasts near which mussels are found in greater numbers, even though current and the like indicates that there ought to be erosion.

What we claim is:

1. Means for neutralizing submarine erosion, characterized in endless strips or narrow lengths of thin non-woven fabrics having a maximum density somewhat higher than the specific gravity of the water being positioned near the sea-bed, in bundles parallel to each other and in the main parallel to the sea-bed, the strips in each bundle being joined together at intervals thereby forming chains, and the individual length of the strips in a bundle between one joining point and the following being varied at least in the case of some of the strips.

2. Means for neutralizing submarine erosion according to claim 1, characterized in the use of 10 to 20 strips in each bundle and the joining points being made with a distance of 1 to 2 meters between them.

3. Means for neutralizing submarine erosion according to claim 1, characterized in the width of the strips being preferably 30 to 100 mm.

4. Means according to claim 1, characterized in the chains being arranged in long rows, and anchoring means being provided at least some of the joining points.

5. Means according to claim 1, characterized in the chains being arranged in a cross pattern, crossing each other at their joining points, and anchoring means being positioned at some of the crossing points.

6. Means according to claim 1, characterized in that the joining points of the chains are anchored by means of two anchoring blocks being connected with strips which grasp the chain by twining.

7. Means according to claim 6, characterized in that one or more of the joining points may be established by twining the anchoring strips around the bundle of strips.

References Cited

UNITED STATES PATENTS

| | | | |
|---|---|---|---|
| 826,619 | 7/1906 | Smith | 61—38 |
| 1,622,568 | 3/1927 | Bignell | 61—3 |
| 1,691,848 | 11/1928 | Johnson | 61—38 |
| 3,299,640 | 1/1967 | Nielsen | 61—3 |
| 3,455,112 | 7/1969 | Twele | 61—3 |
| 3,517,514 | 6/1970 | Visser | 61—38 |

DAVID J. WILLIAMOWSKY, Primary Examiner

P. C. KANNAN, Assistant Examiner